May 26, 1964    C. O. JONKERS ETAL    3,134,454
TRACTORS

Filed Jan. 15, 1962    5 Sheets-Sheet 1

INVENTORS
C. O. JONKERS
F. H. FOCKENS
BY
Mason, Mason & Albright
Attorneys

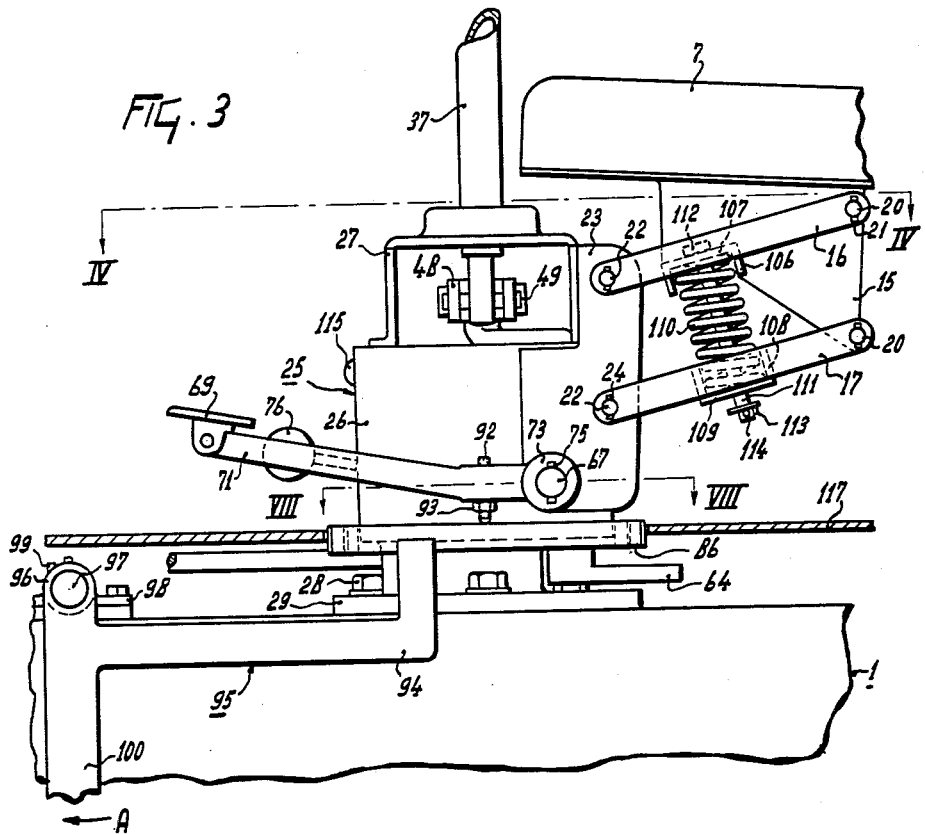
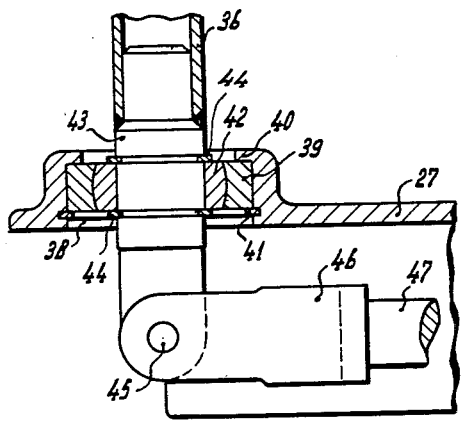
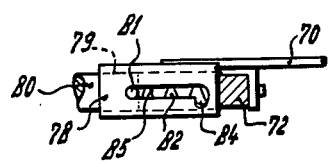

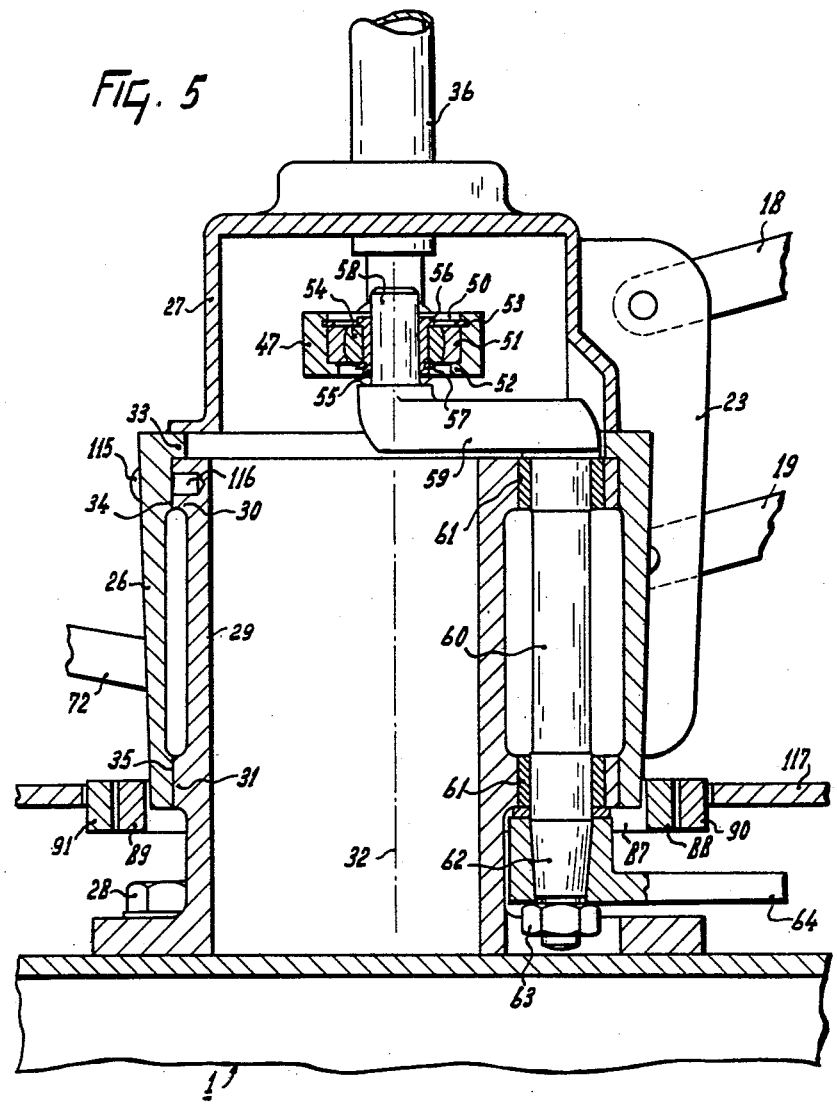

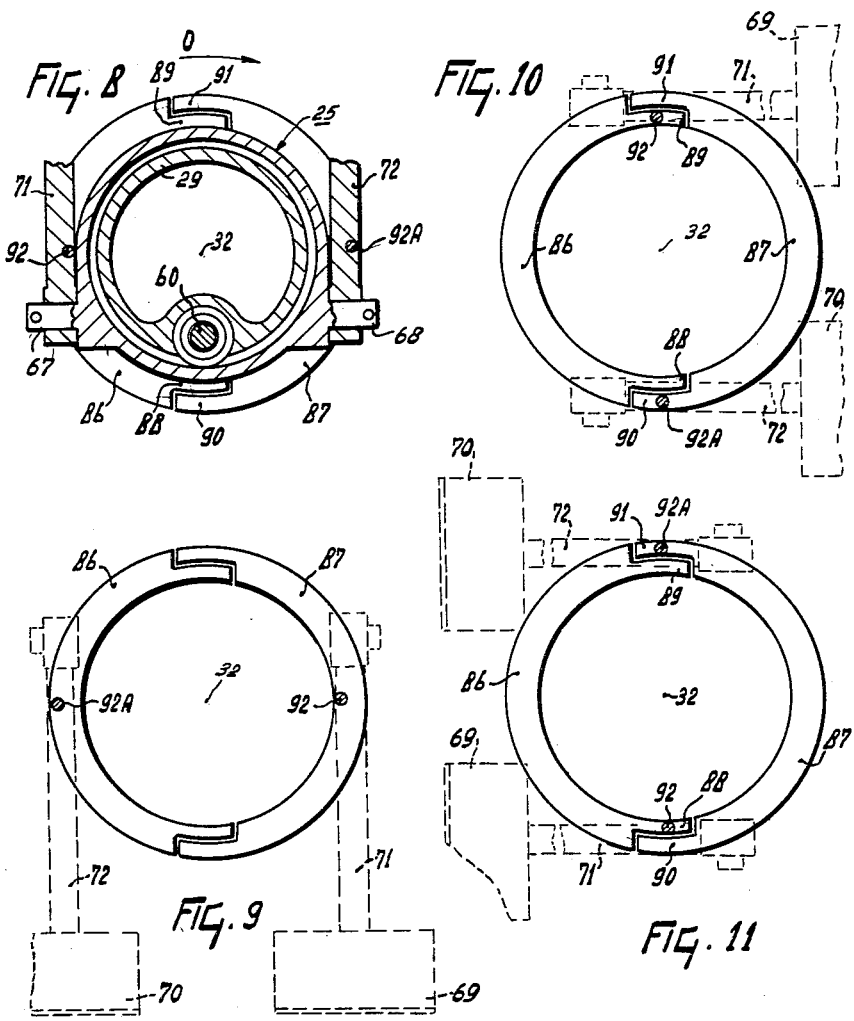

United States Patent Office 3,134,454
Patented May 26, 1964

3,134,454
TRACTORS
Cornelius Otto Jonkers, Delft, and Foppe Hilbertus Fockens, Maasland, Netherlands, assignors to C. van der Lely N.V., Maasland, Netherlands, a Dutch limited-liability company
Filed Jan. 15, 1962, Ser. No. 166,067
Claims priority, application Netherlands Jan. 31, 1961
18 Claims. (Cl. 180—77)

This invention relates to vehicles, such as tractors, of the kind comprising a frame and a driver's seat which is mounted on the frame in such a way that it can be adjusted about a substantially vertical axis and can be retained in any one of a number of different angular settings about the axis.

An object of the invention is the provision of a vehicle of this kind in which control members that are turnable about the axis with the seat are connected in a simple and efficient manner to the mechanism which they govern.

According to the invention there is provided a vehicle of the kind set forth, wherein at least one control member is mounted on, or adjacent to, the seat so as to be adjustable about the axis therewith, the control member being arranged to govern the operation of a mechanism of the vehicle through the intermediary of a coupling member connected to the frame, either the control member or the coupling member including an element which extends at least partly around the said axis and which is arranged to co-operate with the other member.

For a better understanding of the invention, and to show how the same may be carried into effect, reference will now be made, by way of example, to the accompanying drawings, in which.

Figure 4:
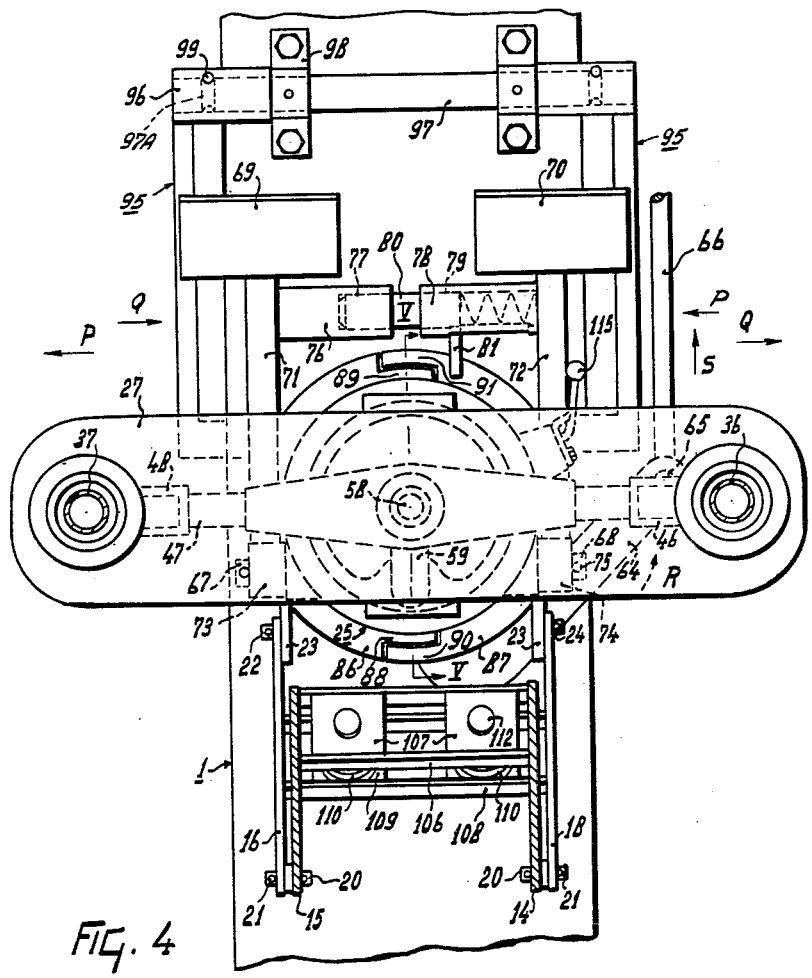

FIGURE 3 is a side elevation, to an enlarged scale, showing the construction and arrangement of certain parts of the tractor in greater detail, FIGURE 4 is a section taken on the line IV—IV of FIGURE 3, FIGURE 5 is a section, to an enlarged scale, taken on the line V—V of FIGURE 4, FIGURE 6 is an elevation, partly in section and to an enlarged scale, showing the arrangement of certain parts of the tractor in greater detail, FIGURE 7 is a view, partly in section and to an enlarged scale, showing part of the tractor which can be seen in FIGURE 4 in greater detail, FIGURE 8 is a section taken on the line VIII—VIII of FIGURE 3, and FIGURES 9, 10 and 11 are diagrams showing the relative positions of certain parts of the tractor under varying conditions.

Referring to the drawings, the tractor has a frame generally indicated by the reference numeral 1 which is supported by two driving wheels 2 and 3 and by a steerable wheel 4, the latter being disposed midway between the wheels 2 and 3 considered in a direction perpendicular to the fixed axis of rotation of the wheels 2 and 3. The frame 1 supports an internal combustion engine 5 which is arranged to drive the wheels 2 and 3 by way of a transmission which is supported by the frame 1 but which is not separately illustrated. The tractor also includes a three-point lifting device 6 and a driver's seat 7.

Transmission of drive from the engine 5 to the wheels 2 and 3 is under the control of a lever 8 which is pivotally connected to the frame 1 by means of a horizontal shaft 9. The shaft 9 is connected to a further horizontal shaft 13 by means of two arms 10 and 12 and an intervening coupling rod 11. The shaft 13 is journalled in the frame 1 and is connected to the transmission arranged between the engine 5 and the wheels 2 and 3. The transmission is preferably of the hydraulic variety and is conveniently so arranged that the tractor is capable of moving in either the direction V or the direction W at the same speed or with the same tractive effort or both.

The underside of the seat 7 carries two relatively spaced supports 14 and 15 (FIGURES 3 and 4) the supports being connected to four arms 16 to 19 (FIGURES 3, 4 and 5). The connections are afforded by four horizontal pivot pins 20 which are restrained against axial displacement by means of split pins or other transverse pins 21. The opposite ends of the arms 16 to 19 are pivotally connected to two vertical support plates 23 by means of four pivot pins 22, disengagement of the arms from the pivot pins 22 being prevented by means of transverse pins 24 similar to the pins 21 previously mentioned. The four arms are freely turnable relative to the supports 14 and 15 and to the plates 23, the latter being secured to a housing 25 having a cylindrical portion 26 and a box-shaped portion 27. The cylindrical portion 26 is rigidly secured to the box-shaped portion 27 and constitutes a fastening member for the seat 7 by virtue of the fact that it is mounted over and around a support 29 which is rigidly secured to the frame 1 by means of bolts 28. The support 29 thus constitutes a coupling member between the housing 25 and the frame 1.

The support 29 has two vertically spaced rings 30 and 31 (FIGURE 5), the common center line 32 of these two rings affording a substantially vertical axis of rotation. The cylindrical portion 26 of the housing 25 which portion surrounds the support 29 has an internal collar 33 which bears against the flat top of the support 29 immediately above the ring 30. The portion 26 also has two rims 34 and 35 which register with the rings 30 and 31 respectively, the arrangement being such that the portion 26 can rotate about the line 32 relative to the support 29 but not move to any appreciable extent relative to the support 29 in a direction perpendicular to the line 32. In order to obtain an entirely satisfactory support of the portion 26, it is preferred that the distance between the rings 30 and 31, and thus the distance between the rims 34 and 35, should be at least two-thirds of the diameter of the rings 30 and 31.

Figure 1:
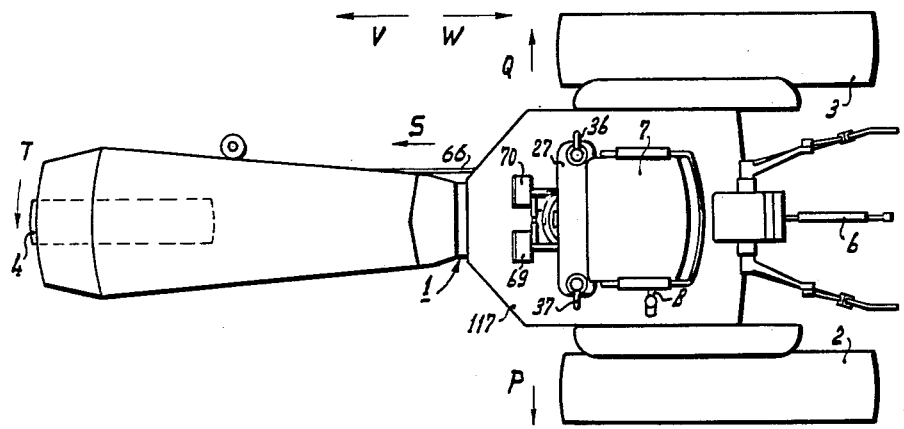
FIGURE 1 is a plan view of a tractor in accordance with the invention.

The portion 27 of the housing 25 extends, in plan view, parallel to the front edge of the seat 7 (see FIGURE 1). At opposite ends of the portion 27 close to the sides of the seat 7 two control-levers which are journalled in the portion 27 project upwardly therefrom. The arrangement of the two levers is similar and is shown in respect of the lever 36 in FIGURE 6 of the drawings. The upper wall of the portion 27 is formed with a circular chamber 38 in which a ring 39 is mounted. The ring 39 is retained in position by means of a collar 40 formed around the mouth of the upper side of the chamber 38 and a resilient retaining ring 41 lodged in a groove in the wall of the chamber 38 below the ring 39. The inner surface of the ring 39 is spherically curved and receives a further ring 42 whose outer surface is shaped to match the inner surface of the ring 39. A pin 43 is passed through the cylindrical opening of the ring 42 and is retained against axial displacement relative to the ring 42 by two resilient retaining rings 44 which are lodged in grooves in the surface of the pin 43 immediately above and below the ring 42. The control lever 36 is fastened to the upper end of the pin 43. The rings 39 and 42 afford a universal joint by which the control lever 36 is pivoted to the mounting of the seat 7.

The lowermost end of the pin 36 is connected by way of a substantially horizontally disposed pivot 45 to a U-shaped bracket 45 (FIGURES 4 and 6) which bracket forms part of a coupling member 47. The pivot 45 extends substantially perpendicular to the front edge of the seat 7 whereas the coupling member 47 extends longitudinally within the box-shaped portion 27, parallel to the front edge of the seat 7, between the bracket 46 and a further bracket 48 which is coupled to the control lever 37 with the aid of a pivot 49 (FIGURE 3) in the same manner as the bracket 46 is coupled to the control lever 36 with the aid of the pivot 45.

The cylindrical recess 50 (FIGURE 5) is formed at the center of the coupling member 47 and accommodates a ring 51 which is retained in position between a collar 52 forming part of the coupling member 47 and a resilient ring 53 lodged in a groove formed in the wall of the recess 50. The interior surface of the ring 51 is of spherical formation and the ring receives a further ring 54 whose outer surface is of matching spherical formation. The cylindrical opening of the ring 54 receives a sleeve 55 which is retained against axial displacement relative to the ring 54 by means of an integral collar 56 arranged above the ring and a resilient ring 57 lodged in a groove disposed immediately below the ring. The sleeve 55 receives a vertical crank pin 58 which is carried by a horizontal arm 59 whose opposite end is rigidly secured to the top of a vertical shaft 60. The vertical shaft 60 is journalled in two spaced bearings 61 mounted in the support 29. The lowermost end 62 of the shaft 60 is of conical formation and an arm 64 is secured thereto with the aid of a nut 63. A coupling rod 66 (FIGURE 4) is connected to the free end of the arm 64 with the aid of a further vertical shaft 65. The opposite end of the coupling rod 66 is coupled with the mounting of the steerable ground wheel 4 in such a way that movements of the said coupling rod will cause alterations of the angular setting of the plane of rotation of the wheel 4. The mechanism for transmission of movement from the levers 36 and 37 to the ground wheel 4 thus comprises two parts, a first part which is adapted to be turnable with the seat 7 and which is afforded by the coupling member 47 and a second part which is connected to the frame 1. The connection between the two said parts is in the form of a universal joint constituted by the rings 51 and 54. The provision of the universal joints 39, 42 and 51, 54 allows the steerable wheel 4 to be smoothly controlled in any position of the seat 7 with the exertion of relatively little effort.

Two horizontal shafts 67 and 68 project from the housing 25 (see FIGURES 3 and 4) and have two bearings 73 and 74, respectively, turnably mounted upon them. The bearings 73 and 74 are retained against axial displacement by means of transverse pins 75. The bearing 73 carries an arm 71 at the free end of which a control member in the form of a brake pedal 69 is provided. Similarly, the bearing 74 carries an arm 72 at the free end of which a further control member in the form of a brake pedal 70 is provided. The arm 71 carries a horizontally disposed sleeve 76 having a bore 77. The arm 72 carries a further sleeve 78 having a bore 79. However, the bore 79 is of greater depth than the bore 77 and accommodates a pin 80 (FIGURES 4 and 7) from the inner end of which a smaller pin 81 projects at right angles. The pin 81 is entered through an elongated slot 82 formed in the wall of the sleeve 78. The slot 82 extends parallel to the longitudinal axis of the sleeve 78 but, at the end thereof closest to the arm 72, the slot merges with a hole 84 which extends downwardly at the right angles to the longitudinal axis of the sleeve 78 towards the lowermost region thereof. The bore 79 contains a compression spring 85 which bears against the inner end of the pin 80 and urges the latter towards the sleeve 76 and arm 71.

The brake pedals 69 and 70 are arranged to co-operate with two sector-shaped coupling elements 86 and 87 which concentrically surround the center line 32 of the support 29. The elements 86 and 87 have a square cross-section and are arranged in circular relationship around the support 29. The opposite ends 88 and 89 of the element 86 and the opposite ends 90 and 91 of the element 87 are narrower than the major parts of these elements and, as can be seen in FIGURES 4 and 8, the said narrower ends of the two elements overlap one another. It will be noticed that, in the said overlapping regions, the two ends 90 and 91 of the element 87 are arranged radially outwardly relative to the two ends 88 and 89 of the element 86. Moreover, the ends 88 and 90 are disposed on a relatively opposite side of the line 32 with respect to the ends 89 and 91. Each of the two elements 86 and 87 has an angular extent a little in excess of 180°. In the embodiment illustrated, the angular extent of each element is about 200°.

Figure 2:
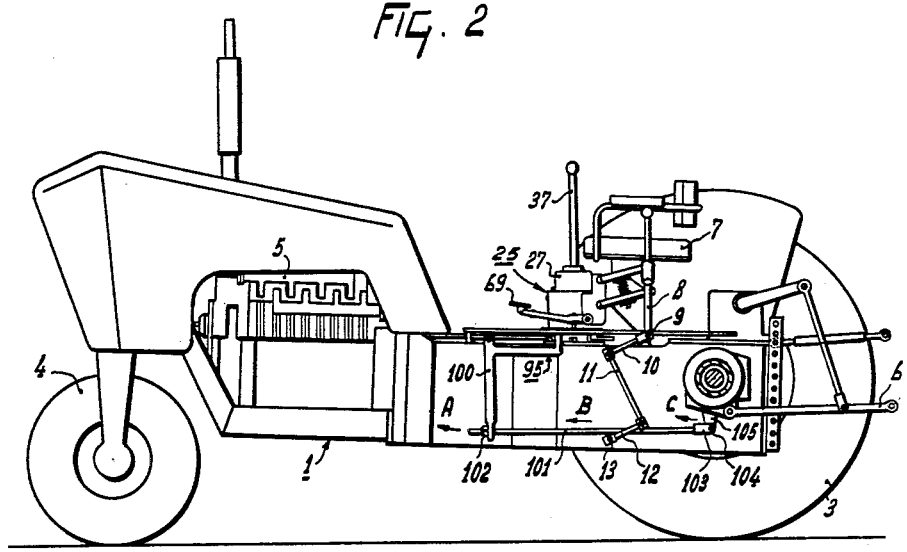
FIGURE 2 is a side elevation corresponding to FIGURE 1.

Stops in the form of studs 92 and 92A (FIGURES 3 and 8) are mounted in bores formed in the arms 71 and 72 respectively. The said studs are screw-threaded and are provided with adjusting nuts 93. The studs are so positioned that they lie on opposite sides of the center line 32, the arrangement being such that the stud 92 bears against the element 86 whereas the stud 92A bears against the element 87 or vice versa. Each of the two elements 86 and 87 is rigidly secured to one arm 94 of a bell crank lever 95 (FIGURES 2, 3 and 4). The lever 95 shown in FIGURE 3 is provided with a horizontal bearing 96 which is turnable about a horizontal shaft 97 journalled in bearings 98 fastened to the frame 1. The bearing 96 is prevented from axial displacement relative to the shaft 97 by means of a pin 99 which is lodged in a hole formed in the bearing 96, the said hole opening laterally into a registering annular groove 97A formed in the surface of the shaft 97. The lever 95 also has an arm 100 which extends perpendicular to the arm 94 and whose lowermost free end is formed with a hole through which one end of a draw-rod 101 is entered. A retaining and adjusting nut 102 is screwed onto the end of the draw-rod 101 which has been passed through the hole in the arm 100. The opposite end of the draw-rod 101 carries a fork 103 which is connected by way of a horizontal pivot 104 to the free end of a lever 105 forming part of the braking mechanism of the ground wheel 2. It will be realized that in FIGURES 2 and 3 only the bell crank lever 95 and associated parts connected to the element 86 are visible. However, similar parts are provided on the opposite side of the tractor in respect to the element 87 and ground wheel 3. Moreover, it will be realized that the ground wheel 2 has been omitted in FIGURE 2 in order not to obscure the parts of the mechanism which are disposed behind it.

With reference to FIGURES 3 and 4, two spaced strips 106 extend between the supports 14 and 15 from the arm 16 to the arm 18 and parallel to the pivot pins 20 and 22. Two plates 107 extend between these strips. In a similar manner, two strips 108 extend between the arms 17 and 19 and carry two plates 109. Two compression springs 110 bear between the two pairs of plates 107 and 109, the said springs surrounding rods 111 which are entered through holes formed centrally of the plates 107 and 109. The rods have heads 112 at their upper ends and, at their lower ends, are provided with washers 113 which are retained in position by transverse pins 114 entered through lateral bores formed at the extreme lowermost ends of the rods 111. In this manner a resilient connection of the seat 7 to the housing 25 is obtained.

A locking pin 115 (FIGURES 4 and 5) is mounted on the cylindrical portion 26 of the housing 25, the tip of the said pin being adapted to co-operate wtih any one of a number of recesses 116 formed in the ring 30 of the support 29. By engaging the tip of the locking pin 115 in one of the recesses 116, the housing 25 and seat 7 are retained against rotation about the center line 32 and are also prevented from vertical displacement in a direction parallel to the line 32.

The operation of the various parts of the tractor which have been described is as follows:

In the position of the seat 7 which is shown in FIGURE 1, the control levers 36 and 37 can be turned in either of two relatively opposite directions P and Q which are both substantially perpendicular to the length of the tractor. If the control levers are turned in the direction indicated by the arrow P, the shaft 60 and the arm 64 will turn in the direction indicated by the arrow R (FIGURES 4 and 5) and the coupling rod 66 moves in the direction indicated by the arrow S in FIGURE 1. Thus, the steerable ground wheel 4, which is connected to the coupling rod 66, has its plane of rotation turned in the direction indicated by the arrow T in FIGURE 1 so that, obviously, the tractor will perform a left-hand turn relative to the direction in which the driver is facing. It will be noted that the direction in which the tractor turns is the same direction as that in which the control levers 36 and 37 were moved to initiate the turn. Upon the control levers 36 and 37 being turned in the direction indicated by the arrow Q in FIGURE 1, all the movements which have just been described will take place in a reverse direction so that the place of rotation of the ground wheel 4 will be turned in a direction opposite to the direction T and the tractor will execute a right hand turn. Once again, the direction in which the tractor turns is the same as the direction in which the control levers 36 and 37 were moved to initiate the turn.

The seat 7 can be turned about the center line 32 and can be fixed in any one of a number of different positions by means of the locking pin 115 and recesses 116. In all such positions of the seat 7, the levers 36 and 37 can still be turned only in directions substantially perpendicular to the length of the tractor so that, in every case, the tractor will turn in the same direction as that in which the levers have been moved to initiate the turn.

When the two brake pedals 69 and 70 are coupled to one another by means of the pin 80 as shown in FIGURE 4, and when either or both of them are depressed, both the elements 86 and 87 will also be depressed by means of the studs 92 and 92A so that both the bell crank levers 95 will be turned in the direction indicated by the arrow A in FIGURE 2. The draw-rods 101 are thus displaced in the direction indicated by the arrow B and the levers 105 are turned in the direction indicated by the arrow C. Thus, the brakes of both the wheels 2 and 3 are applied simultaneously.

In the use of tractors of the kind illustrated, it is very often desirable that the tractor should be able to execute very tight bends. This is facilitated by braking that one of the two ground wheels 2 and 3 which lies on the radially innermost side of the bend which is to be executed while at the same time maintaining the drive to the other wheel. To this end, the pin 80 is withdrawn from the bore 77 of the sleeve 76 against the action of the spring 85 and the pin 81 is moved into the hole or recess 84 to retain the pin 80 in a withdrawn position. When this step has been taken and the seat 7 occupies the position shown in FIGURES 1 to 4, the brake pedal 69 and stud 92 co-operate with the element 86 while the brake pedal 70 and stud 92A co-operate with the element 87 (see FIGURE 8). Obviously, each of the two driven ground wheels 2 and 3 can then be independently braked by the use of the brake pedal 69 or 70 which is disposed closest to the wheel in question.

Upon turning the seat 7 through 180° about the line 32 to the position shown diagrammatically in FIGURE 9, the brake pedal 70 is closest to the wheel 2 while the brake pedal 69 is closest to the wheel 3. However, as can be seen in FIGURE 9, the stud 92 co-operates with the element 87 and the stud 92A co-operates with the element 86 so that, despite the reversal of the seat 7, each of the two driven ground wheels 2 and 3 can still be braked by depression of the pedal 69 or 70 which is closest thereto.

When the seat 7 is turned through 90° about the line 32 in the direction indicated by the arrow O in FIGURE 8, the brake pedals 69 and 70, the elements 86 and 87 and the parts associated therewith take up the relative positions shown diagrammatically in FIGURE 10. As can be seen in that figure, the stud 92 associated with the brake pedal 69 co-operates with the end 89 of the element 86 while the stud 92A associated with the pedal 70 co-operates with the end 90 of the element 87. Thus, in practice, the arrangement is the same as that illustrated in FIGURE 8, that is to say, depression of the pedal 69 brakes the ground wheel 2 while depression of the pedal 70 brakes the ground wheel 3.

FIGURE 11 shows diagrammatically the arrangement when the seat 70 has been turned through 90° from the position illustrated in FIGURE 8 in a direction opposite to the direction indicated by the arrow O in the latter figure. In this case, the stud 92 associated with the pedal 69 co-operates with the end 88 of the element 86 and the stud 92A associated with the pedal 70 co-operates with the end 91 of the element 87. Thus, in practice, the arrangement is again the same as when the parts occupy the position shown in FIGURE 8, that is to say, depression of the pedal 69 brakes the wheel 2 while depression of the pedal 70 brakes the wheel 3. It will be appreciated that the arrangement which has been described is such that when the seat 7 is facing forwardly of the tractor and the brake pedals 69 and 70 are uncoupled from one another, depression of either pedal brakes the driven ground wheel 2 or 3 which is cloest to that pedal. The seat 7 can be turned up to 90° in either direction from the position just mentioned to enable the driver to keep a close watch on some operation which is being carried out by an implement to one side of the tractor, the pedals 69 and 70 still acting to brake the same wheels as when the driver is facing forwardly of the tractor. Only when the seat 7 has been turned through more than 90° relative to the position shown in FIGURE 8 so that the driver is facing more or less to the rear of the tractor is the connection of the pedals 69 and 70 to the brakes of the wheels 2 and 3 reversed whereby depression of the pedal 69 brakes the wheel 3 and depression of the pedal 70 brakes the wheel 2. This arrangement has been found to be most effective in preventing braking errors.

The seat 7 and housing 25 can be readily dismounted from the support 29 merely by withdrawing the locking pin 115 from one of the recesses 116 and lifting the whole assembly vertically off the support 29. The control levers 36 and 37 and the brake pedals 69 and 70 are removed at the same time since they are all connected to the housing 25. Since the coupling member 47 is not rigidly connected to the crank pin 58 (FIGURE 5) it will be apparent that the seat 7 and housing 25 can be removed from the support 29 without having to take any steps other than the withdrawal of the locking pin 115.

After the removal of the seat 7 and housing 25, a foot plate 117 (FIGURE 1) can also be removed as can the support 29 and the bell crank levers 95 which are both connected to the frame in a simple manner. The transmission between the engine 5 and the ground wheels 2 and 3 is then rendered accessible.

It will be apparent that other control members mounted adjacent the seat 7 can, if desired, be connected to the mechanisms which they are to govern in a similar manner. For example, a control member may be mounted on, or adjacent to, the seat 7 for the control of the fuel supply to the engine 5. This control member will be arranged to co-operate with a coupling member afforded by an element arranged concentrically around the line 32 through an angular extent which is at least equal to that through which the seat 7 can be turned.

It will be understood that although the invention has been described by way of example in its application to an agricultural tractor, it is not limited to this kind of vehicle and may be used with equal facility for vehicles of other types. In this connection, it is pointed out that the arrangement which has been described whereby the pedals 69 and 70 each control the braking of the ground wheel 2 or 3 which is closest to them, regardless of whether the seat 7 is facing the front or the rear of the tractor, is of particular importance in the case of vehicles having caterpillar tracks since, as is well known, the steering of such vehicles is usually accomplished wholly by braking one track while maintaining the drive to the other track.

What we claim is:

1. A vehicle comprising a frame supported on steerable ground wheel means, a driver's seat mounted on said frame, said seat being adjustable about a vertical axis and provided with a fastening member, said frame being provided with a support member, steering means mounted on said fastening member and turnable about said vertical axis with said seat, a transmission mechanism coupling the steering means with said steerable wheel means, said transmission mechanism comprising two parts which are rotatable with respect to each other about a vertical pivot axis, the first part being adapted to turn with the seat and the second part occupying a fixed position with respect to the frame when the seat is turned, the fastening member and the support member and the two parts of the transmission mechanism being slidable relative to one another in a vertical direction whereby the seat and steering means can be mounted on and dismounted from the vehicle.

2. A vehicle as claimed in claim 1 wherein said fastening member comprises a bushing which surrounds the support member, said bushing being rotatable with respect to said support member about said vertical axis and slidable parallel to said vertical axis.

3. A vehicle as claimed in claim 1 wherein the first part of said transmission mechanism comprises a universal joint and a sleeve, said joint and sleeve being rotatable about and slidable along a vertical pin, said pin comprising the second part of said transmission mechanism.

4. A vehicle comprising a frame supported on steerable ground wheel means, a driver's seat mounted on said frame, said seat being provided with a fastening member, said frame being provided with a support member, steering means mounted on said fastening member, a transmission mechanism coupling the steering means with said steerable ground wheel means, said transmission mechanism comprising two parts, the first part being connected with said fastening member and the second part being connected to the frame, the fastening member and the support member and the two parts of said transmission mechanism being slidable relative to one another in a vertical direction whereby the seat and steering means can be mounted on and dismounted from the vehicle.

5. A vehicle comprising a frame supported by at least two ground engaging members, said members being arranged on relatively opposite sides of the longitudinal axis of said vehicle, a driver's seat mounted on said frame, said seat being adjustable about a vertical axis, means for retaining said seat in any one of a number of different angular settings about said vertical axis, a control member mounted adjacent said seat and turnable about said vertical axis, said control member being arranged to govern in a first position of the seat the revolutions of a first ground engaging member through a first coupling member and to govern in a second position of said seat the revolutions of a second ground engaging member through a second coupling member, said control member being connected to said frame, at least one of said coupling members including an element extending partly around the vertical axis, said element operatively associating the control member with one of said coupling members.

6. The vehicle of claim 5 wherein a plurality of control members are each mounted adjacent said seat and turnable about said vertical axis, each of said control members being operatively associated with a separate coupling member.

7. The vehicle of claim 6 wherein the control members comprise brake pedals, each of said pedals being connected through a coupling member to the brake mechanism of a ground engaging member.

8. The vehicle of claim 5 wherein said element is arranged so that its center line of curvature substantially coincides with said vertical axis.

9. The vehicle of claim 5 wherein to each said coupling member is attached an element, said element being concentrically arranged around said vertical axis, the major portions of said elements being disposed on opposite sides of a vertical plane containing said vertical axis and extending substantially parallel to the longitudinal axis of the vehicle.

10. The vehicle of claim 9 wherein the opposite ends of the two portions are arranged in overlapping relationship.

11. The vehicle of claim 10 wherein the two ends of one portion are located radially inwardly relative to the two ends of the other portion.

12. The vehicle of claim 9 wherein each element subtends an angle of approximately 200° at the axis of rotation of said seat.

13. The vehicle of claim 6 wherein two control members and two coupling members are operatively associated whereby the point at which one control member contacts a coupling member is closer to the axis of rotation of said seat than the point at which the other control member contacts the other coupling member.

14. The vehicle of claim 6 wherein the control members comprise brake pedals, said pedals being pivotally mounted and arranged to produce displacement of said coupling members when depressed.

15. The vehicle of claim 7 wherein stops are connected to the brake pedals, said stops being arranged to transmit movements from the brake pedals to the coupling members.

16. The vehicle of claim 15 wherein the stops are located at different distances from the axis of rotation of said seat.

17. The vehicle of claim 15 wherein the stops are adjustable.

18. The vehicle of claim 7 wherein the coupling members are connected to the braking mechanisms by means including levers.

References Cited in the file of this patent

UNITED STATES PATENTS

| | | |
|---|---|---|
| 1,641,813 | Johnston et al. | Sept. 6, 1927 |
| 2,633,926 | Minor | Apr. 7, 1953 |
| 2,666,491 | Johnson | Jan. 19, 1954 |
| 2,840,140 | Harrington | June 24, 1958 |
| 2,917,103 | Korn | Dec. 15, 1959 |
| 2,984,311 | Wehsely | May 16, 1961 |

FOREIGN PATENTS

| | | |
|---|---|---|
| 515,911 | Great Britain | Dec. 18, 1939 |
| 985,448 | France | Mar. 14, 1951 |